US010308874B2

(12) United States Patent
Lan et al.

(10) Patent No.: US 10,308,874 B2
(45) Date of Patent: Jun. 4, 2019

(54) LIQUID CRYSTAL MATERIALS, METHODS OF FABRICATING LIQUID CRYSTAL DISPLAY PANELS AND LIQUID CRYSTAL DISPLAY PANELS

(71) Applicant: Shenzhen China Star Optoelectronics Technology Co., Ltd., Shenzhen (CN)

(72) Inventors: Song Lan, Shenzhen (CN); Yungjui Lee, Shenzhen (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 335 days.

(21) Appl. No.: 15/109,128

(22) PCT Filed: May 13, 2016

(86) PCT No.: PCT/CN2016/081972
§ 371 (c)(1),
(2) Date: Jun. 30, 2016

(87) PCT Pub. No.: WO2017/181457
PCT Pub. Date: Oct. 26, 2017

(65) Prior Publication Data
US 2018/0120652 A1 May 3, 2018

(30) Foreign Application Priority Data
Apr. 22, 2016 (CN) .......................... 2016 1 0259739

(51) Int. Cl.
*C09K 19/56* (2006.01)
*C09K 19/30* (2006.01)
(Continued)

(52) U.S. Cl.
CPC .......... *C09K 19/56* (2013.01); *C09K 19/3028* (2013.01); *C09K 19/3068* (2013.01);
(Continued)

(58) Field of Classification Search
None
See application file for complete search history.

(56) References Cited

U.S. PATENT DOCUMENTS

2015/0252265 A1* 9/2015 Archetti ............. C09K 19/3402
349/130
2018/0023001 A1* 1/2018 Tanaka .................... C07C 69/54
252/299.4

FOREIGN PATENT DOCUMENTS

CN 104845644 A 8/2015
CN 104965359 A 10/2015
(Continued)

OTHER PUBLICATIONS

English translation of CN105316008. (Year: 2016).*
English translation of JP2004341024. (Year: 2004).*
English translation of JP2007232934. (Year: 2007).*

*Primary Examiner* — Cynthia H Kelly
*Assistant Examiner* — Anna Malloy
(74) *Attorney, Agent, or Firm* — Leong C. Lei

(57) ABSTRACT

The liquid crystal material of the disclosure includes liquid crystal molecules, polymerizable monomers and a vertical alignment agent, wherein the polymerizable monomers and the vertical alignment agent can be polymerized under ultraviolet irradiation to form a polymer, while the polymer deposits on a substrate to form a polymer film capable of replacing the PI alignment film; so that an alignment process of the liquid crystal is simplified, and a cost is economized. The method of fabricating the liquid crystal display panel of the disclosure eliminates the fabricating process of the alignment film.

10 Claims, 7 Drawing Sheets

(51) Int. Cl.
*C09K 19/38* (2006.01)
*C09K 19/34* (2006.01)
*G02F 1/1333* (2006.01)
*G02F 1/13* (2006.01)
*G02F 1/03* (2006.01)
*G02F 1/1343* (2006.01)
*G02F 1/1337* (2006.01)
*G02F 1/1335* (2006.01)

(52) U.S. Cl.
CPC .......... *C09K 19/3458* (2013.01); *C09K 19/38* (2013.01); *G02F 1/0316* (2013.01); *G02F 1/1303* (2013.01); *G02F 1/13439* (2013.01); *G02F 1/133345* (2013.01); *G02F 1/133514* (2013.01); *G02F 1/133703* (2013.01); *G02F 1/133788* (2013.01); *G02F 1/134309* (2013.01); *C09K 2019/3004* (2013.01); *C09K 2019/3016* (2013.01); *C09K 2019/3036* (2013.01); *C09K 2019/3075* (2013.01); *C09K 2019/3083* (2013.01)

(56) References Cited

FOREIGN PATENT DOCUMENTS

| | | | | | |
|---|---|---|---|---|---|
| CN | 105001879 | A | * | 10/2015 | ......... C09K 19/3402 |
| CN | 105001879 | A | | 10/2015 | |
| CN | 105316008 | A | * | 2/2016 | ............ C09K 19/56 |
| JP | 2004341024 | A | * | 12/2004 | |
| JP | 2007232934 | A | * | 9/2007 | |

\* cited by examiner

LIQUID CRYSTAL MATERIALS, METHODS OF FABRICATING LIQUID CRYSTAL DISPLAY PANELS AND LIQUID CRYSTAL DISPLAY PANELS

FIELD OF THE INVENTION

The present application relates to display technology field, especially to a liquid crystal material, a method of fabricating a liquid crystal display panel, and a liquid crystal display panel.

BACKGROUND OF THE INVENTION

With the development of the display technology, due that flat display devices of liquid crystal displays (LCD) and the like have advantages of high definition, power saving, thin body, wide range application etc., the flat display devices are widely applied to various consumer electronic products of mobile phones, televisions, personal digital assistants, notebook computers, desktop computers and the like, so as to be the mainstream of the display devices.

Most of the liquid crystal devices in current market are backlight type liquid crystal display, which includes a liquid crystal display panel and a backlight module. The working principle of the liquid crystal display panel is: placing liquid crystal molecules in two parallel glass substrates, which have many vertical and horizontal fine wires between the two glass substrates; controlling the liquid crystal molecules to change direction by energizing or not energizing; and refracting light of the backlight module to produce frames.

Generally, the liquid crystal display panel is consisting of a color filter (CF) substrate, a thin film transistor (TFT) substrate, liquid crystal interposed between the CF substrate and the TFT substrate, and a sealant.

A thin film material is respectively formed on the CF substrate and the TFT substrate in the liquid crystal display, a main action of the thin film material is to arrange for the liquid crystal molecules according to a certain direction, the thin film material, we call an alignment film, usually is polyimide (PI) material. A main composition of this type alignment film is a rubbing alignment type PI material or an optical alignment type PI material; however, no matter what the type of alignment material is, it has its own shortcoming. Firstly, the rubbing alignment type PI material easily causes problems of dust particles, residual electrostatic, and brush mark etc.; thereby reducing process yield. Although the optical alignment PI material can obviate such problems, it has limited material characteristics, poor heat resistance, poor aging resistance, and weaker ability of anchoring liquid crystal molecules; thereby affecting panel quality. Secondly, the PI material itself has high polarity and high water absorption, storage and transport easily cause deterioration that results in uneven alignment, and the price of PI material is expensive, the process of forming a film on the TFT-LCD is complex; thereby increasing panel cost. In the fabrication of liquid crystal display panel, if the arrangement of liquid crystal molecules is made by omitting the PI film, the cost of fabricating panels will be greatly reduced.

SUMMARY OF THE INVENTION

An aspect of the present application is to provide a liquid crystal material, including liquid crystal molecules, polymerizable monomers, and a vertical alignment agent, the polymerizable monomers and the vertical alignment agent can occur a polymerization to form a polymer, the polymer deposits on a substrate to form a polymer film, which can replace the PI alignment film, so that an alignment process of liquid crystal is simplified, a cost is economized.

Another aspect of the present application is to provide a method of fabricating a liquid crystal display panel. The method eliminates a fabricating process of the alignment film, has simple process and low cost.

A further aspect of the present application is to provide a liquid crystal display panel utilizing a polymer film, which is obtained by polymerizing the polymerizable monomers and the vertical alignment agent, to replace the alignment film, that not only meets the aspect of liquid crystal alignment, but also prevent impurities in the TFT and CF substrates to diffuse into the liquid crystal layer, so as to greatly enhance quality of the panel, and to have a low fabricating cost.

To achieve the aforesaid aspects, the present application provides a liquid crystal material, including liquid crystal molecules, a vertical alignment agent, and polymerizable monomers;

the vertical alignment agent includes one or more than one of following compounds:

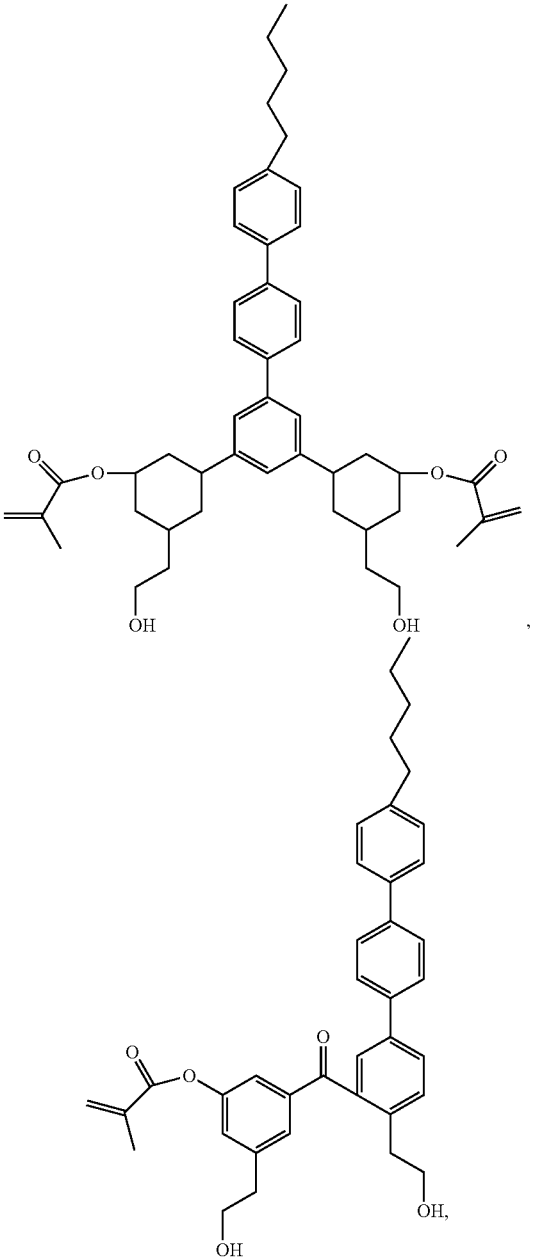

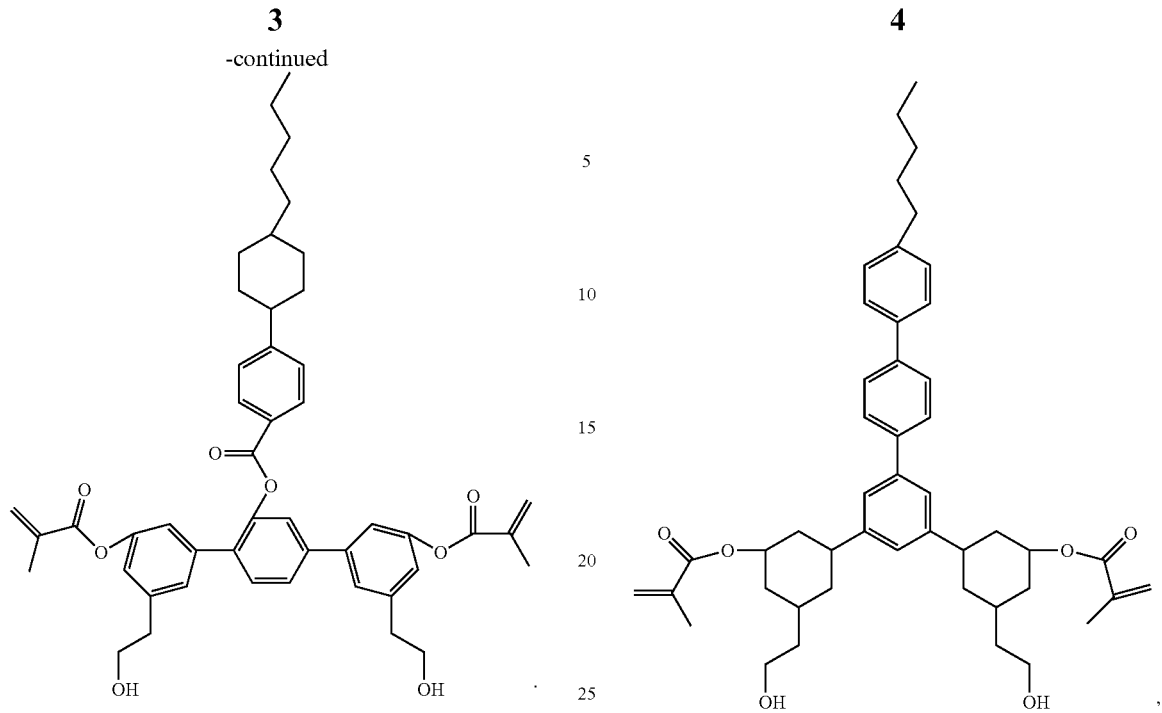

A mass percentage of the liquid crystal molecules is 94.0%~98.6%, a mass percentage of the vertical alignment agent is 1.0%~5.0%, a mass percentage of the polymerizable monomers is 0.3%~0.5%; the polymerizable monomers include one or a combination of more than one of acrylates, acrylate derivatives, methacrylates, methacrylate derivatives, styrene, styrene derivatives, and epoxy resin.

The liquid crystal material further includes photo initiator, a mass percentage of the photo initiator is 0.1%~0.5%, the photo initiator includes one or a combination of more than one of azobisisobutyronitrile, dialkyl peroxide base compounds, diacyl peroxide base compounds, and lipid peroxide base compound.

The present application further provides a method of fabricating a liquid crystal display panel, including following steps:

step 1, providing an upper substrate, a lower substrate, and a liquid crystal material;

the upper substrate including a first substrate, and a first electrode disposed on the first substrate; the lower substrate including a second substrate, and a second electrode disposed on the second substrate;

the liquid crystal material including liquid crystal molecules, a vertical alignment agent, and polymerizable monomers;

the vertical alignment agent including one or more than one of following compounds:

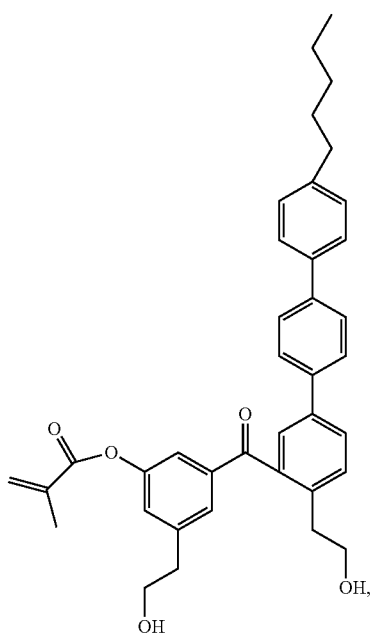

-continued

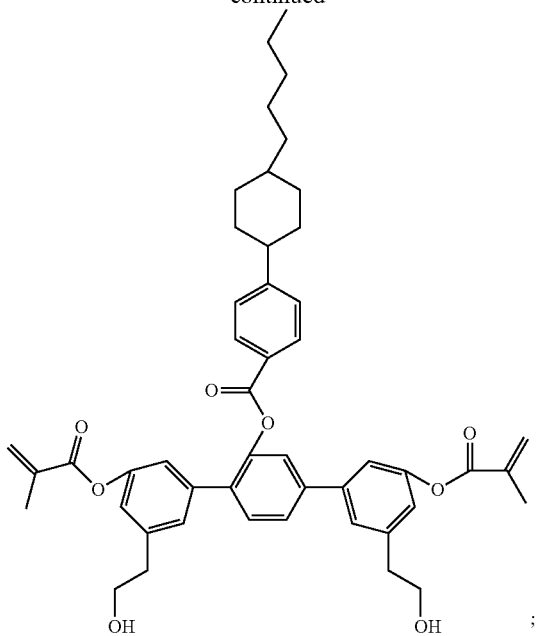

step 2, dripping the liquid crystal material on the upper substrate or the lower substrate, coating a sealant on a peripheral position of the upper substrate or the lower substrate, then assembling and laminating the upper substrate and the lower substrate, and curing the sealant;

a part of the vertical alignment agent in the liquid crystal material adsorbing the upper substrate and the lower substrate to reach a saturation adsorption, and arranging perpendicular to the upper substrate and the lower substrate, so as to guide the liquid crystal molecules arranging perpendicular to the upper substrate and the lower substrate; another part of the vertical alignment agent dissociating in the liquid crystal material;

step 3, applying a voltage to both sides of the liquid crystal material through the first electrode and the second electrode, to allow the liquid crystal molecules occurring deflection and arranging at a certain inclination angle between the upper substrate and the lower substrate;

performing a first ultraviolet irradiation to the liquid crystal material from a side of the upper substrate or the lower substrate, to allow the vertical alignment agent in the liquid crystal material and the polymerizable monomers occurring a polymerization to form a polymer, wherein the polymer deposits on the upper substrate toward a side of the liquid crystal material to form a first polymer film, and simultaneously deposits on the lower substrate toward a side of the liquid crystal material to form a second polymer film, both the first polymer film and the second polymer film have rough surfaces;

step 4, to stop applying the voltage to the both sides of the liquid crystal layer, due to both the first polymer film and the second polymer film having the rough surfaces, the liquid crystal molecules near the first polymer film and the second polymer film maintaining their inclination angle in a steric hindrance manner, and the liquid crystal molecules away from the first polymer film and the second polymer film reinstating a vertical alignment;

performing a second ultraviolet irradiation to the liquid crystal material from a side of the upper substrate or the lower substrate, to allow the retained vertical alignment agent and the polymerizable monomers in the liquid crystal material occurring a polymerization to form a polymer, wherein the polymer deposits on the first polymer film and the second polymer film;

constituting a liquid crystal layer by the liquid crystal material in which the vertical alignment agent and the polymerizable monomers are removed, to complete the fabrication of the liquid crystal display panel.

In the liquid crystal material, a mass percentage of the liquid crystal molecules is 94.0%~98.6%, a mass percentage of the vertical alignment agent is 1.0%~5.0%, a mass percentage of the polymerizable monomers is 0.3%~0.5%; the polymerizable monomers include one or a combination of more than one of acrylates, acrylate derivatives, methacrylates, methacrylate derivatives, styrene, styrene derivatives, and epoxy resin.

The liquid crystal material further includes photo initiator, a mass percentage of the photo initiator is 0.1%~0.5%, the photo initiator includes one or a combination of more than one of azobisisobutyronitrile, dialkyl peroxide base compounds, diacyl peroxide base compounds, and lipid peroxide base compound.

In step 3, the voltage applied to the both sides of the liquid crystal material is 13~25V; in the first ultraviolet irradiation of step 3, an illumination intensity of the ultraviolet is 85~100 mW/cm$^2$, an irradiation time is 20~30 min; in the second ultraviolet irradiation of step 4, an illumination intensity of the ultraviolet is 85~100 mW/cm$^2$, an irradiation time is 90~120 min.

In step 1, the upper substrate and the lower substrate respectively are a TFT substrate and a CF substrate; the first electrode and the second electrode respectively are a pixel electrode and a common electrode; in step 3 and step 4, the first and the second ultraviolet irradiations are performed from the side of the upper substrate.

The present application further provides a liquid crystal display panel, including: oppositely disposed an upper substrate and a lower substrate, a liquid crystal layer disposed between the upper substrate and the lower substrate, a first polymer film disposed on the upper substrate toward a side surface of the liquid crystal layer, and a second polymer film disposed on the lower substrate toward a side surface of the liquid crystal layer; wherein the upper substrate includes a first substrate and a first electrode disposed on the first substrate; the lower substrate includes a second substrate and a second electrode disposed on the second substrate;

the liquid crystal layer includes liquid crystal molecules; the liquid crystal molecules in the liquid crystal layer near the first polymer film and the second polymer film arrange at a certain inclination angle between the upper substrate and the lower substrate; the liquid crystal molecules in the liquid crystal layer away from the first polymer film and the second polymer film arrange perpendicular to the upper substrate and the lower substrate;

both the first polymer film and the second polymer film have rough surfaces, and are formed by polymerizing the polymerizable monomers and the vertical alignment agent;

the vertical alignment agent includes one or more than one of following compounds:

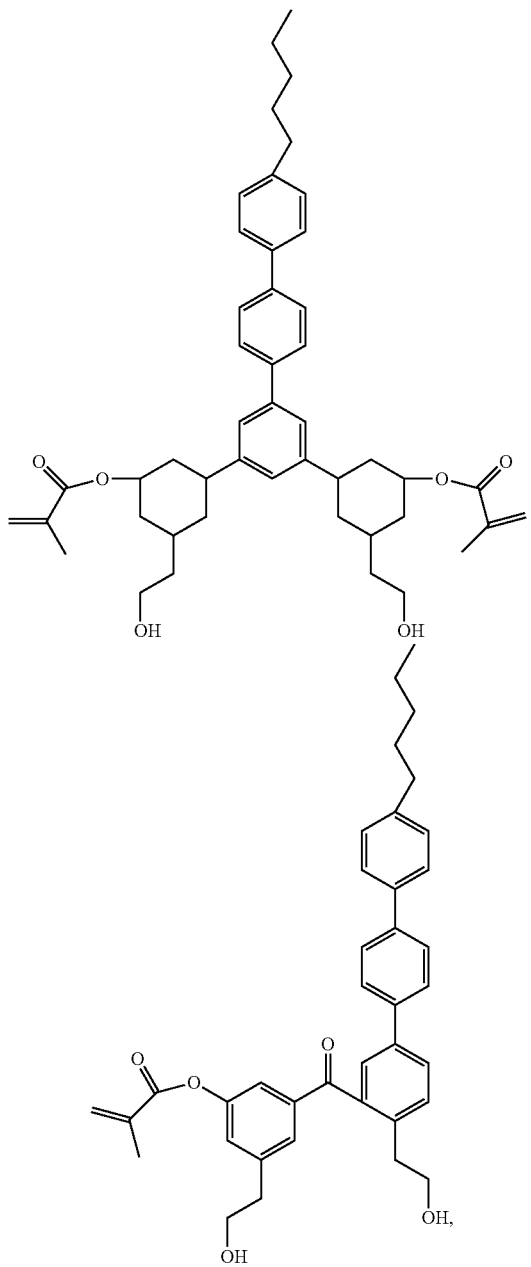

The polymerizable monomers include one or a combination of more than one of acrylates, acrylate derivatives, methacrylates, methacrylate derivatives, styrene, styrene derivatives, and epoxy resin; thicknesses of the first polymer film and the second polymer film are 600~1200 Å.

Advantages of the present application: the liquid crystal material of the present application includes liquid crystal molecules, polymerizable monomers and a vertical alignment agent, the polymerizable monomers and the vertical alignment agent can occur a polymerization to form a polymer, the polymer deposits on a substrate to form a polymer film, which can replace the PI alignment film, so that an alignment process of liquid crystal is simplified, a cost is economized. The method of fabricating the liquid crystal display panel of the present application eliminates a fabricating process of the alignment film, has simple process and low cost. The liquid crystal display panel utilizes a polymer film, which is obtained by polymerizing the polymerizable monomers and the vertical alignment agent, to replace the alignment film, that not only meets the aspect of liquid crystal alignment, but also prevent impurities in the TFT and CF substrates to diffuse into the liquid crystal layer, so as to greatly enhance quality of the panel, and to have a low fabricating cost.

In order to further understand the technical features and contents of the present application, please refer to the following detailed description and accompanying drawings related to the present application; however, the accompanying drawings are provided only for reference and description, and are not used to limit the present application.

BRIEF DESCRIPTION OF THE DRAWINGS

The technical features and other advantages of the present application will become more readily apparent to those ordinarily skilled in the art, by referring the following detailed description of embodiments of the present application in conjunction with the accompanying drawings.

In the accompanying drawings.

DETAILED DESCRIPTION OF PREFERRED EMBODIMENTS

In order to further clarify the technical means adopted in the present application and the effects thereof, the preferable embodiments of the present application and the accompanying drawings thereof will be more specifically described as follows.

Figure 2:
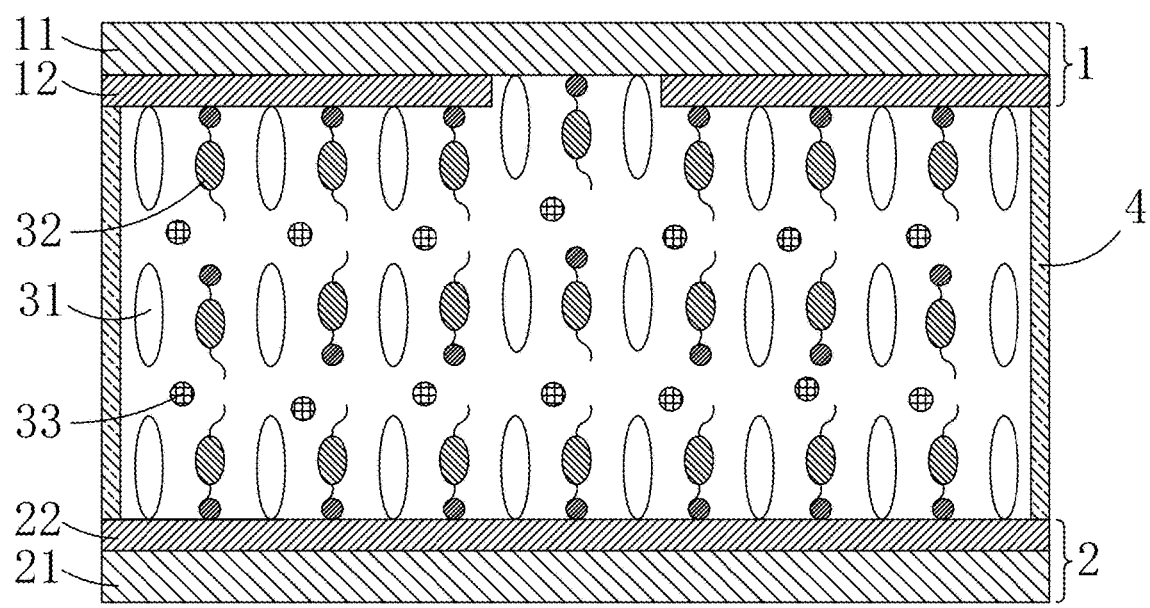
FIG. 2 is a figure schematically illustrating steps 1-2 of the method of fabricating the liquid crystal display panel of the present application.

Please refer to FIG. 2, the present application provides a liquid crystal material, including liquid crystal molecules 31, a vertical alignment agent 32, and polymerizable monomers (RM) 33.

The vertical alignment agent includes one or more than one of following compounds:

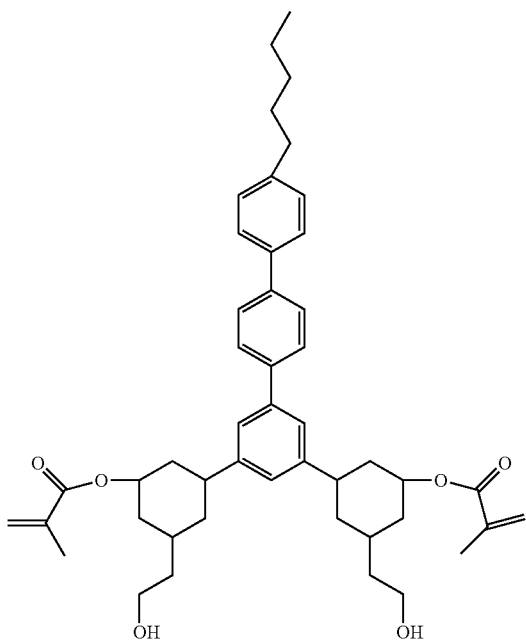

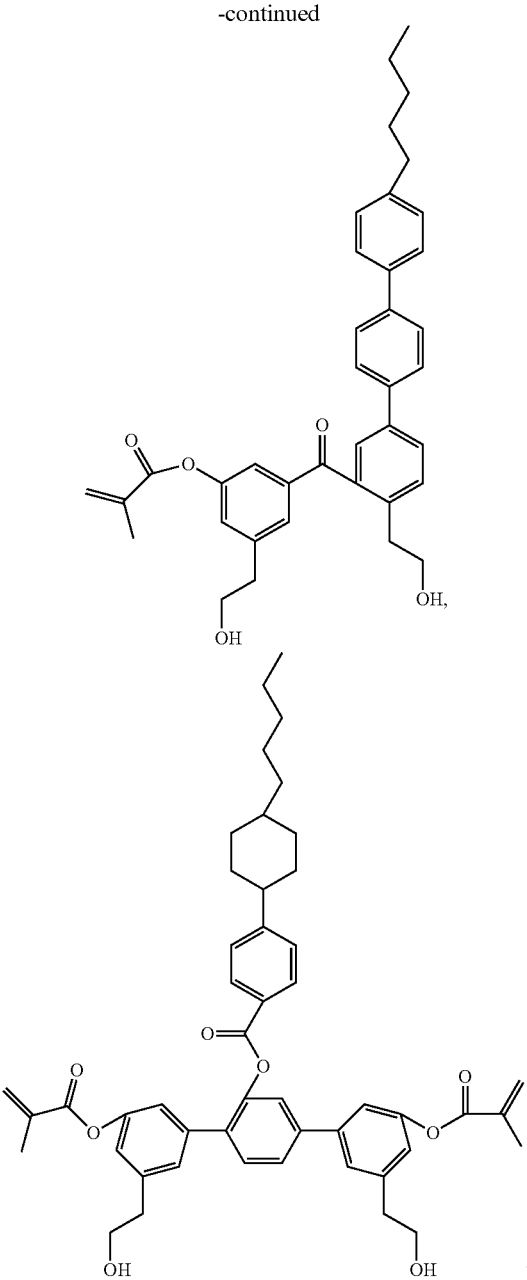

Specifically, in the liquid crystal material, a mass percentage of the liquid crystal molecules 31 is 94.0%~98.6%, a mass percentage of the vertical alignment agent 32 is 1.0%~5.0%, a mass percentage of the polymerizable monomers 33 is 0.3%~0.5%.

Specifically, the polymerizable monomers 33 include one or a combination of more than one of acrylates, acrylate derivatives, methacrylates, methacrylate derivatives, styrene, styrene derivatives, and epoxy resin; wherein the epoxy resin can be fatty amine base epoxy resins.

Preferably, the liquid crystal material further includes a photo initiator, and a mass percentage of the photo initiator is 0.1%~0.5%.

Specifically, the photo initiator includes one or a combination of more than one of azobisisobutyronitrile, dialkyl peroxide base compounds, diacyl peroxide base compounds, and lipid peroxide base compound.

Specifically, the liquid crystal molecules 31 are a negative dielectric anisotropic liquid crystal compound, the negative dielectric anisotropic liquid crystal compound includes one or more than one following compounds:

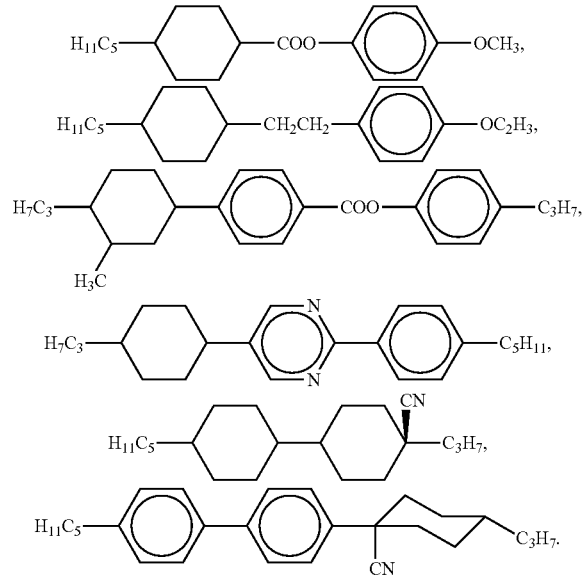

Figure 1:
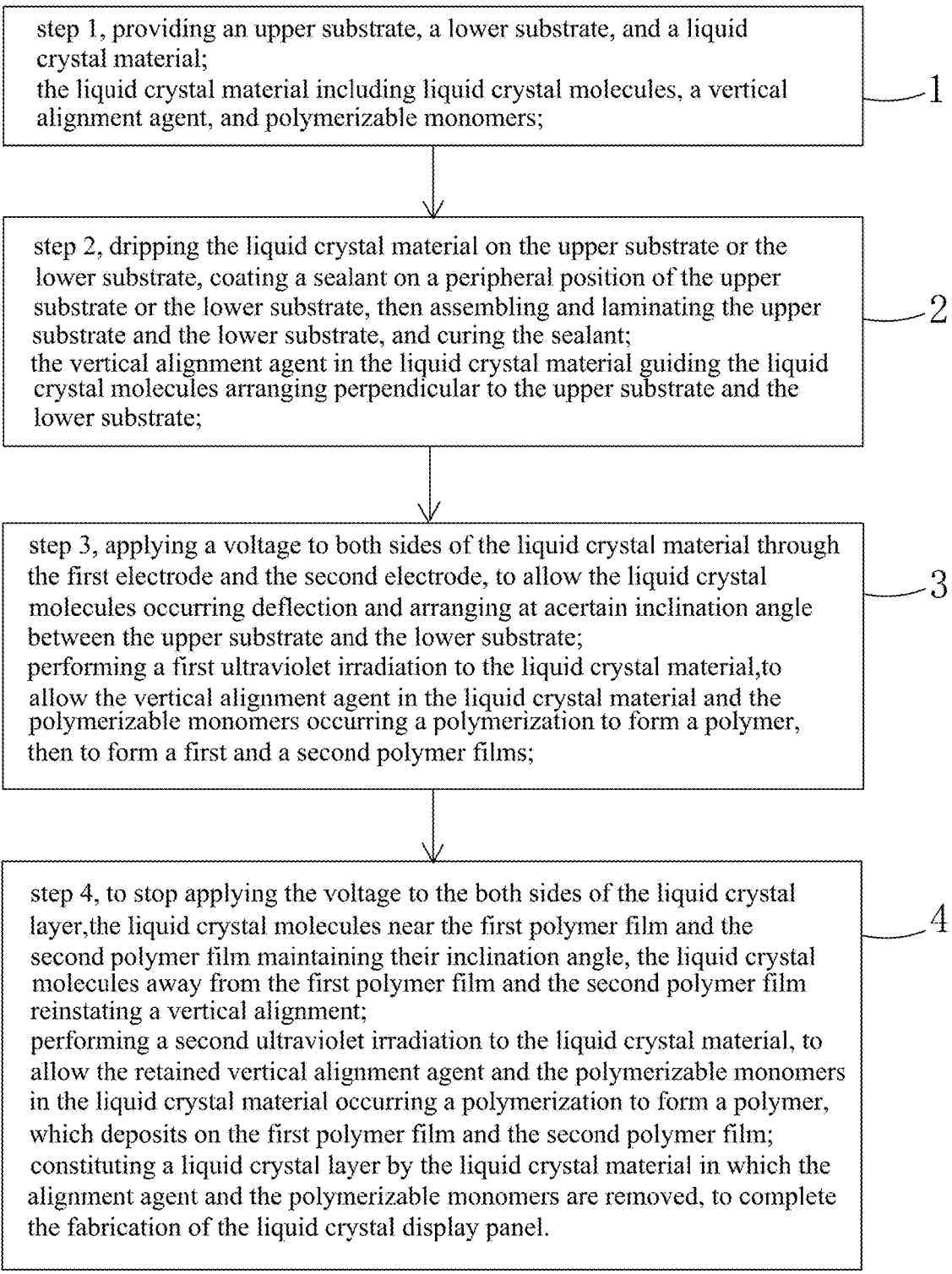
FIG. 1 is a flow chart schematically illustrating a method of fabricating a liquid crystal display panel of the present application.

Please refer to FIG. 1, the present application further provides a method of fabricating a liquid crystal display panel, including following steps.

Step 1, please refer to FIG. 2, providing an upper substrate 1, a lower substrate 2, and a liquid crystal material.

The upper substrate 1 includes a first substrate 11, and a first electrode 12 disposed on the first substrate 11; the lower substrate 2 includes a second substrate 21, and a second electrode 22 disposed on the second substrate 21.

The liquid crystal material includes liquid crystal molecules 31, a vertical alignment agent 32, and polymerizable monomers (RM) 33.

The vertical alignment agent 32 includes one or more than one of following compounds:

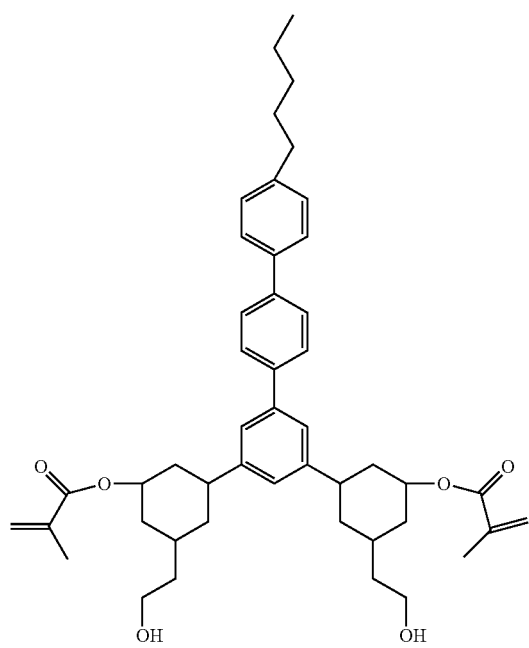

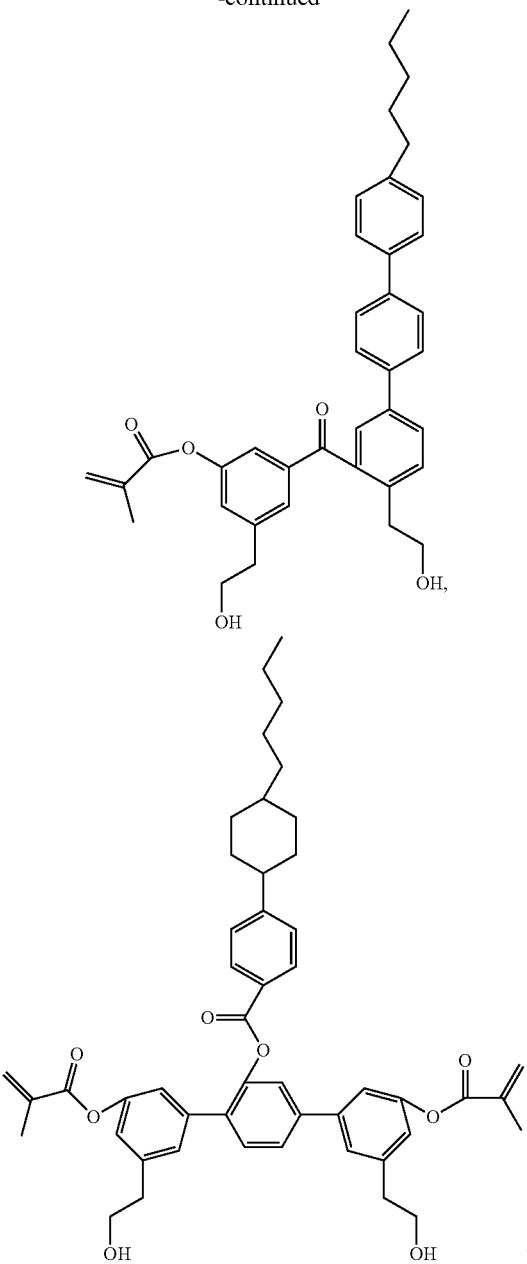

Specifically, the polymerizable monomers 33 include one or a combination of more than one of acrylates, acrylate derivatives, methacrylates, methacrylate derivatives, styrene, styrene derivatives, and epoxy resin; wherein the epoxy resin can be fatty amine base epoxy resins.

Specifically, in the liquid crystal material, a mass percentage of the liquid crystal molecules 31 is 94.0%~98.6%, a mass percentage of the vertical alignment agent 32 is 1.0%~5.0%, a mass percentage of the polymerizable monomers 33 is 0.3%~0.5%.

Preferably, the liquid crystal material further includes a photo initiator, and a mass percentage of the photo initiator is 0.1%~0.5%.

Specifically, the photo initiator includes one or a combination of more than one of azobisisobutyronitrile, dialkyl peroxide base compounds, diacyl peroxide base compounds, and lipid peroxide base compound.

Specifically, the upper substrate 1 and the lower substrate respectively are a TFT substrate and a CF substrate; the first electrode 12 and the second electrode 22 respectively are a pixel electrode and a common electrode.

Step 2, please refer to FIG. 2, dripping the liquid crystal material on the upper substrate 1 or the lower substrate 2, coating a sealant 4 on a peripheral position of the upper substrate 1 or the lower substrate 2, then assembling and laminating the upper substrate 1 and the lower substrate 2, and curing the sealant 4.

A part of the vertical alignment agent 32 in the liquid crystal material adsorbing the upper substrate 1 and the lower substrate 2 to reach a saturation adsorption, and arranging perpendicular to the upper substrate 1 and the lower substrate 2, so as to guide the liquid crystal molecules 31 arranging perpendicular to the upper substrate 1 and the lower substrate 2; another part of the vertical alignment agent 32 dissociating in the liquid crystal material.

Preferably, in step 2, after the sealant 4 is coated on the peripheral position of the upper substrate 1 or the lower substrate 2, an electric conductive adhesive (not shown) is coated on a periphery of the sealant 40.

Preferably, in step 2, the upper substrate 1 and the substrate 2 are assembled and laminated in a vacuum environment.

Specifically, in step 2, curing the sealant 4 utilizes a method of heating or ultraviolet (UV) irradiation.

Figure 3:
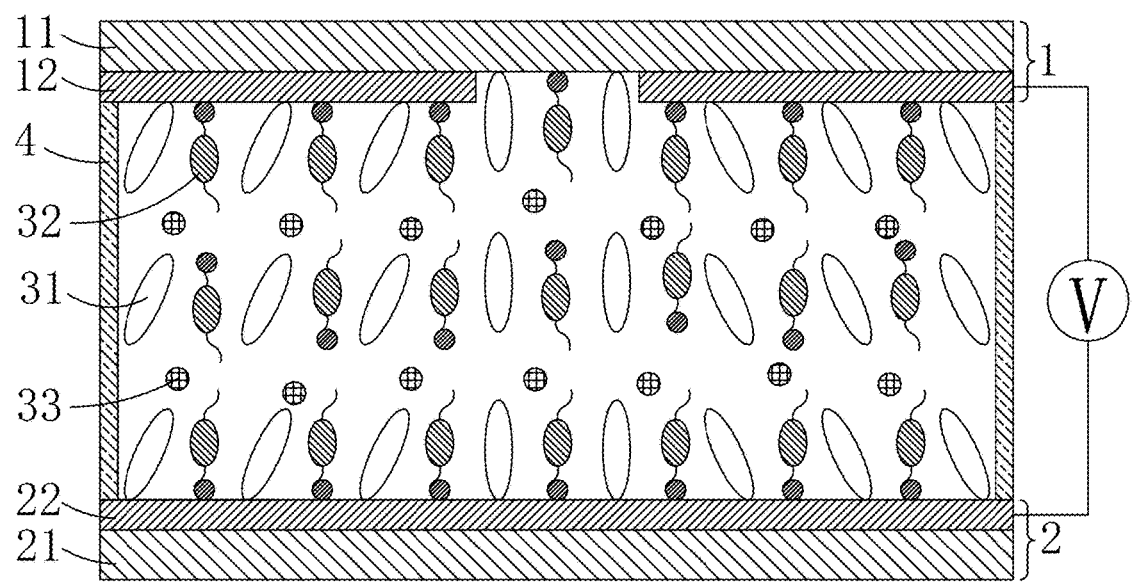
FIGS. 3-4 are figures schematically illustrating step 3 of the method of fabricating the liquid crystal display panel of the present application.

Step 3, as shown in FIG. 3, applying a voltage to both sides of the liquid crystal material through the first electrode 11 and the second electrode 21, to allow the liquid crystal molecules 31 occurring deflection and arranging at a certain inclination angle between the upper substrate 1 and the lower substrate 2.

Figure 4:
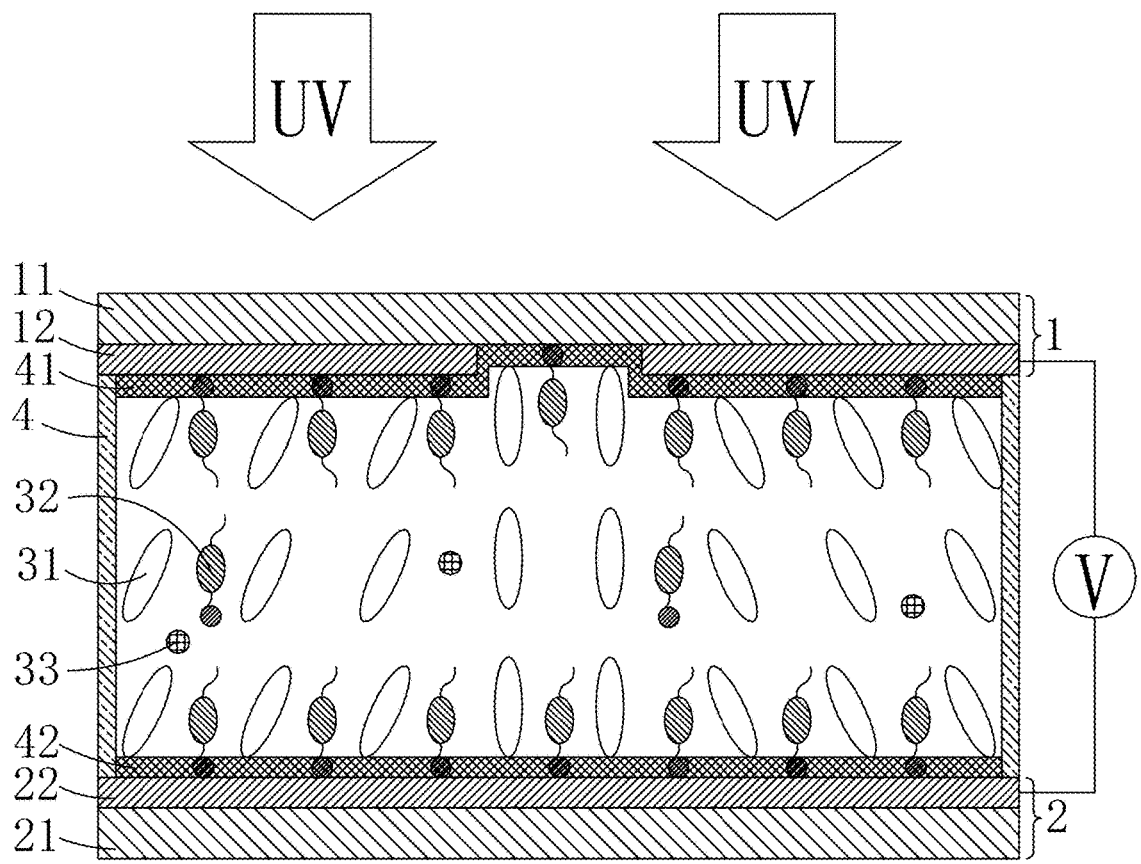

As shown in FIG. 4, performing a first ultraviolet irradiation to the liquid crystal material from a side of the upper substrate 1 or the lower substrate 2, to allow the vertical alignment agent 32 in the liquid crystal material and the polymerizable monomers 33 occurring a polymerization to form a polymer, wherein the polymer deposits on the upper substrate 1 toward a side of the liquid crystal material to form a first polymer film 41, and simultaneously deposits on the lower substrate 2 toward a side of the liquid crystal material to form a second polymer film 42, both the first polymer film 41 and the second polymer film 42 have rough surfaces.

Specifically, in step 3, the voltage applied to the both sides of the liquid crystal material is 13~25V.

Specifically, in the first ultraviolet irradiation, an illumination intensity of the ultraviolet is 85~100 mW/cm$^2$, an irradiation time is 20~30 min.

Figure 5:
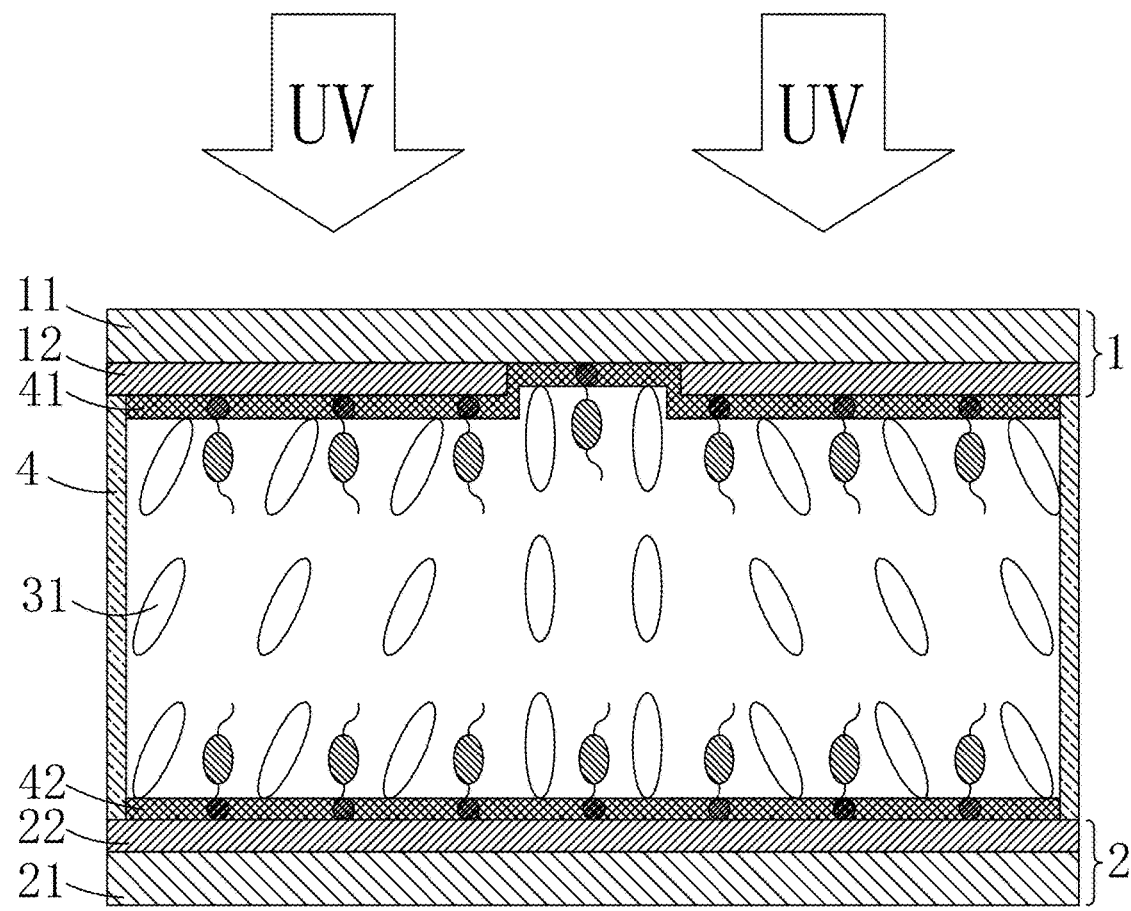
FIG. 5 is a figure schematically illustrating step 4 of the method of fabricating the liquid crystal display panel of the present application.

Step 4, as shown in FIG. 5, to stop applying the voltage to the both sides of the liquid crystal layer 3, due to both the first polymer film 41 and the second polymer film 42 having the rough surfaces, the liquid crystal molecules 31 near the first polymer film 41 and the second polymer film 42 maintaining their inclination angle in a steric hindrance manner, and the liquid crystal molecules 31 away from the first polymer film 41 and the second polymer film 42 reinstating a vertical alignment.

Performing a second ultraviolet irradiation to the liquid crystal material from a side of the upper substrate 1 or the lower substrate 2, to allow the retained vertical alignment agent 32 and the polymerizable monomers 33 in the liquid crystal material occurring a polymerization to form a polymer, wherein the polymer deposits on the first polymer film 41 and the second polymer film 42.

Figure 6:
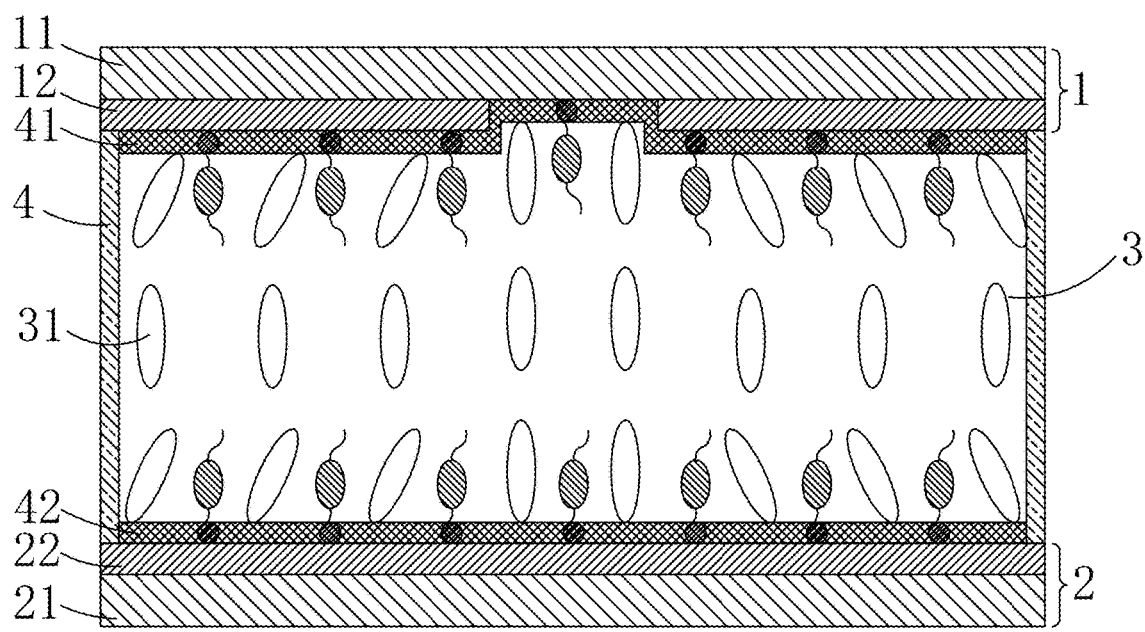
FIG. 6 is a figure schematically illustrating a structure of a liquid crystal display panel of the present application.

As shown in FIG. 6, constituting a liquid crystal layer 3 by the liquid crystal material in which the vertical alignment agent 32 and the polymerizable monomers 33 are removed, to complete the fabrication of the liquid crystal display panel.

Specifically, in the second ultraviolet irradiation, an illumination intensity of the ultraviolet is 85~100 mW/cm$^2$, an irradiation time is 90~120 min.

Preferably, in step 3 and step 4, the first and the second ultraviolet irradiations are performed from the side of the upper substrate 1 (i.e. the TFT substrate). Because the TFT substrate has a higher transmittance compared to the CF substrate, UV transmittance can be increased, and an effect of UV irradiation can be enhanced.

Please refer to FIG. 6, the present application further provides a liquid crystal display panel, including: oppositely disposed an upper substrate 1 and a lower substrate 2, a liquid crystal layer 3 disposed between the upper substrate 1 and the lower substrate 2, a first polymer film 41 disposed on the upper substrate 1 toward a side surface of the liquid crystal layer 3, and a second polymer film 42 disposed on the lower substrate 2 toward a side surface of the liquid crystal layer 3; wherein the upper substrate 1 includes a first substrate 11 and a first electrode 12 disposed on the first substrate 11; the lower substrate 2 includes a second substrate 21 and a second electrode 22 disposed on the second substrate 21.

The liquid crystal layer 3 includes liquid crystal molecules 31; the liquid crystal molecules 31 in the liquid crystal layer 3 near the first polymer film 41 and the second polymer film 42 arrange at a certain inclination angle between the upper substrate 1 and the lower substrate 2; the liquid crystal molecules 31 in the liquid crystal layer 3 away from the first polymer film 41 and the second polymer film 42 arrange perpendicular to the upper substrate 1 and the lower substrate 2.

Both the first polymer film 41 and the second polymer film 42 have rough surfaces, and are formed by polymerizing the polymerizable monomers 33 and the vertical alignment agent 32.

The vertical alignment agent includes one or more than one of following compounds:

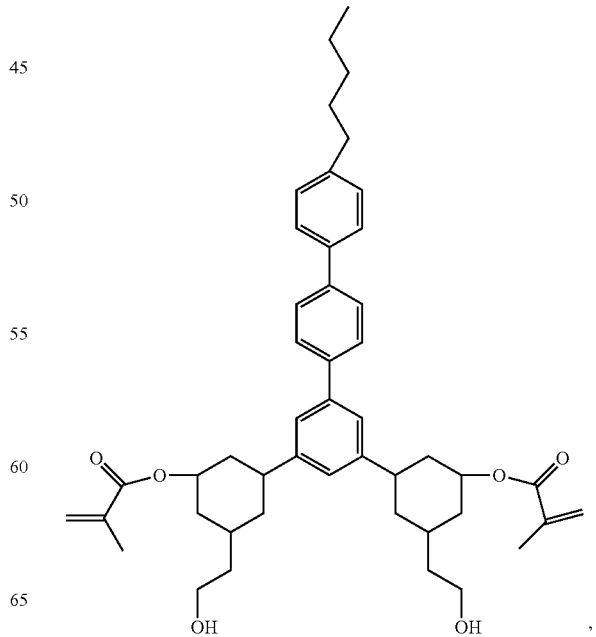

-continued

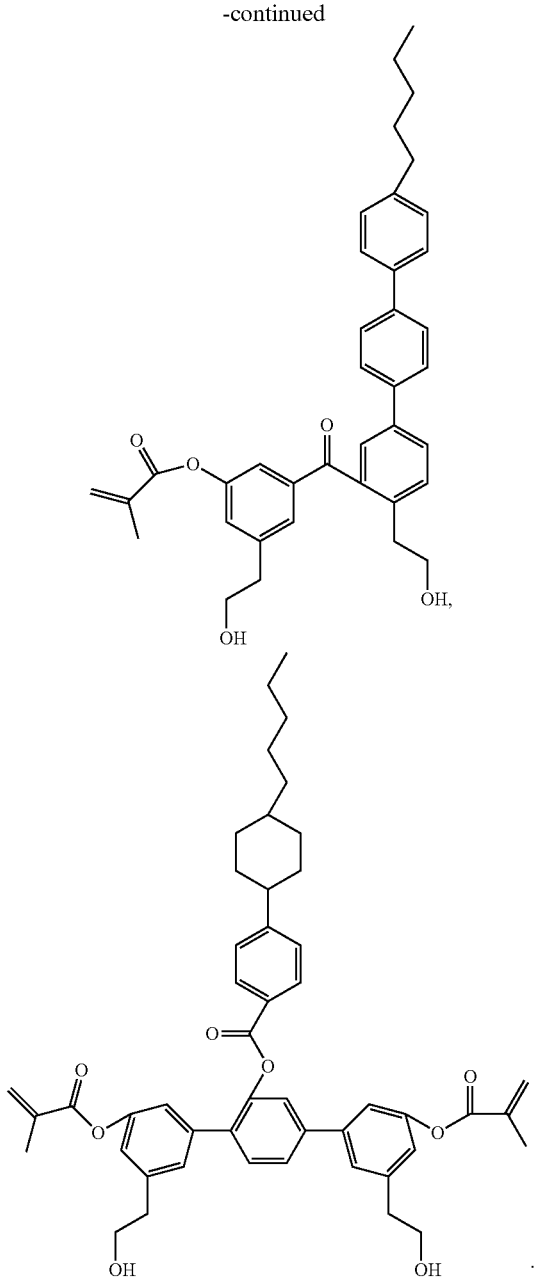

Figure 7:
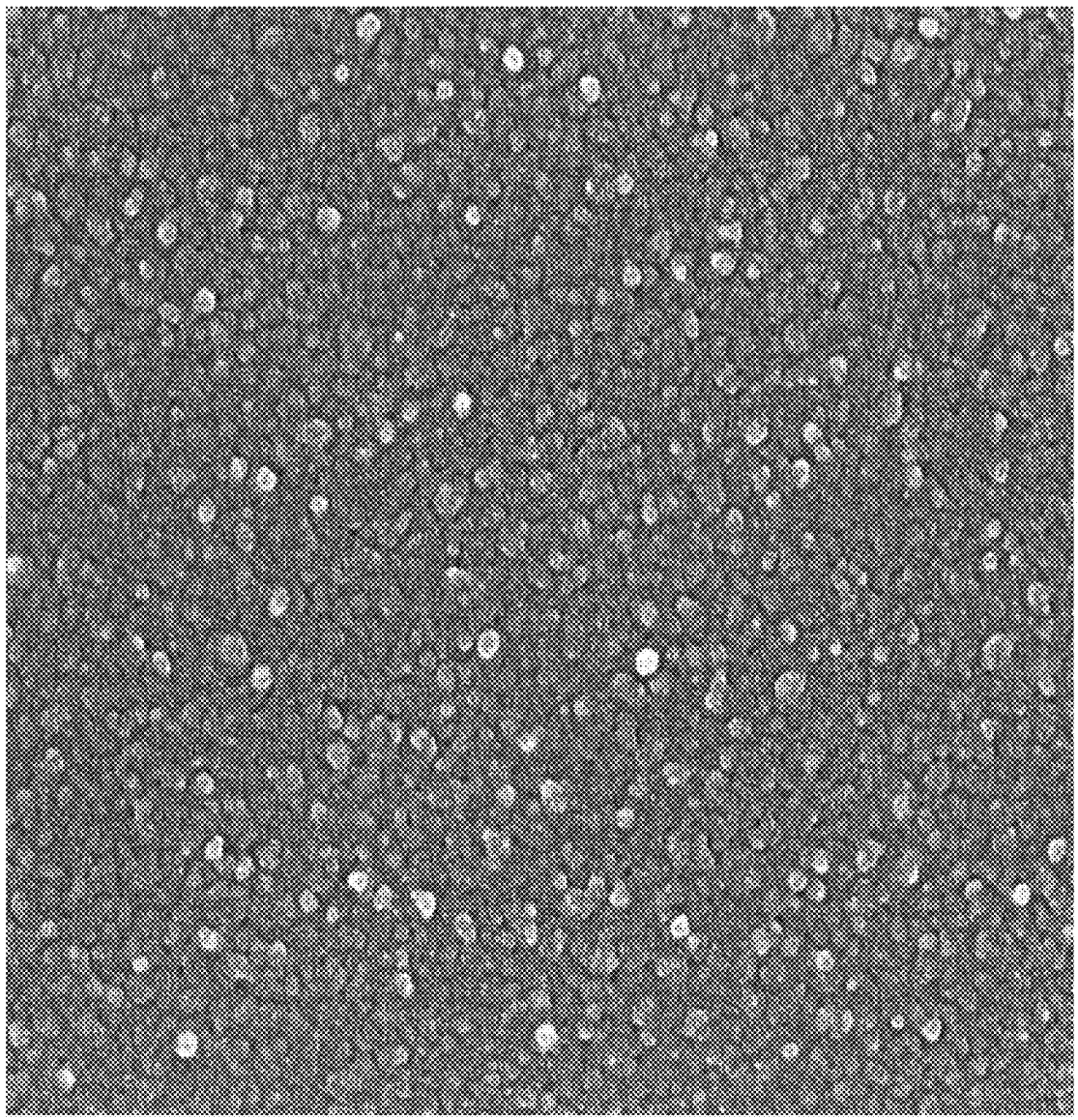
FIG. 7 is a scanning electron microscope picture schematically illustrating surface topographies of a first polymer film and a second polymer film in the liquid crystal display panel shown in FIG. 6.

Specifically, thicknesses of the first polymer film 41 and the second polymer film 42 are 600~1200 Å. FIG. 7 is a scanning electron microscope picture schematically illustrating surface topographies of the first polymer film 41 and the second polymer film 42, as shown in FIG. 7, both the first polymer film 41 and the second polymer film have rough surfaces. Specifically, both the rough surfaces of the first polymer film 41 and the second polymer film 42 include plural projections and recesses, a height difference between the adjacent projection and recess is 0~1200 Å.

Specifically, the polymerizable monomer 33 includes one or a combination of more than one of acrylates, acrylate derivatives, methacrylates, methacrylate derivatives, styrene, styrene derivatives, and epoxy resin; wherein the epoxy resin can be fatty amine base epoxy resins.

Specifically, the liquid crystal display panel further includes a sealant 4 disposed between the upper substrate 1 and the lower substrate 2 and located at periphery of the liquid crystal layer 3. Preferably, the liquid crystal display panel further includes an electric conductive adhesive (not shown) is located at a periphery of the sealant 40.

Specifically, the upper substrate 1 and the lower substrate respectively are a TFT substrate and a CF substrate; the first electrode 12 and the second electrode respectively are a pixel electrode and a common electrode.

In summary, the present application provides a liquid crystal material, a method of fabricating a liquid crystal display panel, and a liquid crystal display panel. The liquid crystal material of the present application includes liquid crystal molecules, polymerizable monomers and a vertical alignment agent, the polymerizable monomers and the vertical alignment agent can occur a polymerization to form a polymer, the polymer deposits on a substrate to form a polymer film, which can replace the PI alignment film, so that an alignment process of liquid crystal is simplified, a cost is economized. The method of fabricating the liquid crystal display panel of the present application eliminates a fabricating process of the alignment film, has simple process and low cost. The liquid crystal display panel utilizes a polymer film, which is obtained by polymerizing the polymerizable monomers and the vertical alignment agent, to replace the alignment film, that not only meets the aspect of liquid crystal alignment, but also prevent impurities in the TFT and CF substrates to diffuse into the liquid crystal layer, so as to greatly enhance quality of the panel, and to have a low fabricating cost.

Based on the above description, an ordinarily skilled in the art can complete various similar modifications and arrangements according to the technical programs and ideas of the present application, and the scope of the appended claims of the present application should encompass all such modifications and arrangements.

What is claimed is:

1. A liquid crystal material, comprising liquid crystal molecules, vertical alignment agent, and polymerizable monomers; wherein
the vertical alignment agent comprises one or more than one of the following compounds:

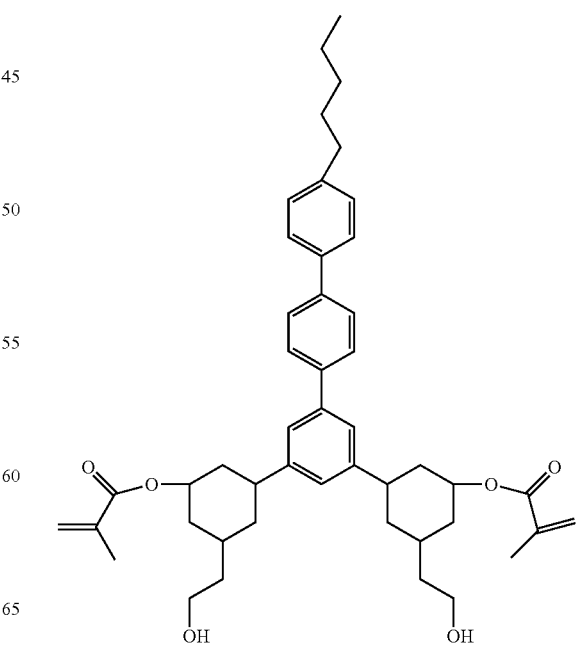

-continued

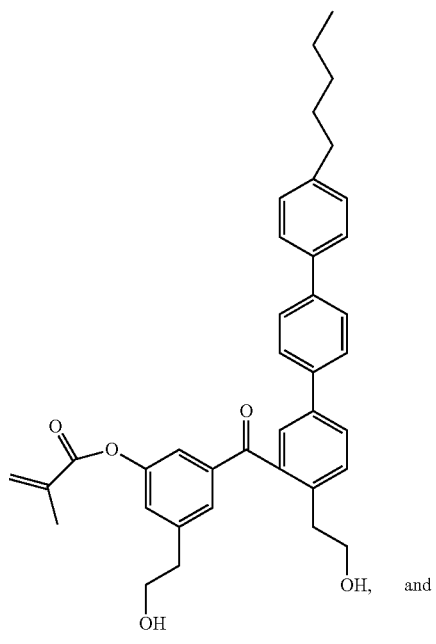
and

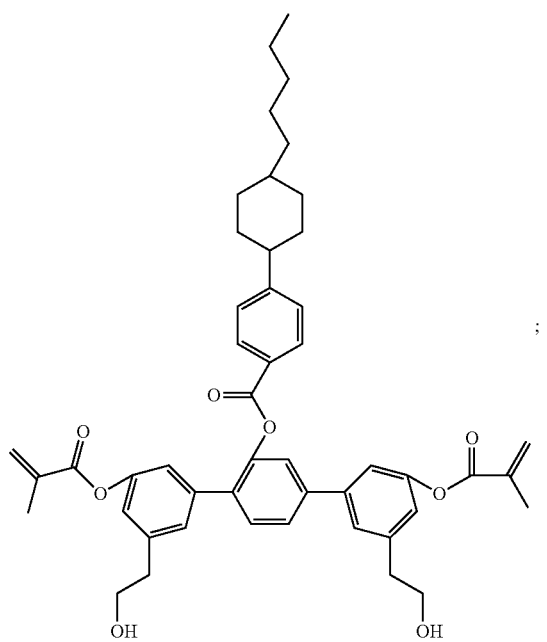 [SMILES: C=C(C)C(=O)Oc1cc(CCO)cc(-c2ccc(-c3cc(CCO)cc(OC(=O)C(=C)C)c3)c(OC(=O)c3ccc(C4CCC(CCCCC)CC4)cc3)c2)c1]
;

and the liquid crystal molecules comprises one or more than one of the following negative dielectric anisotropic liquid crystal compounds:

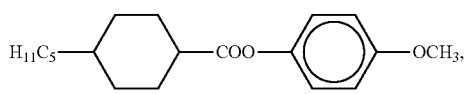

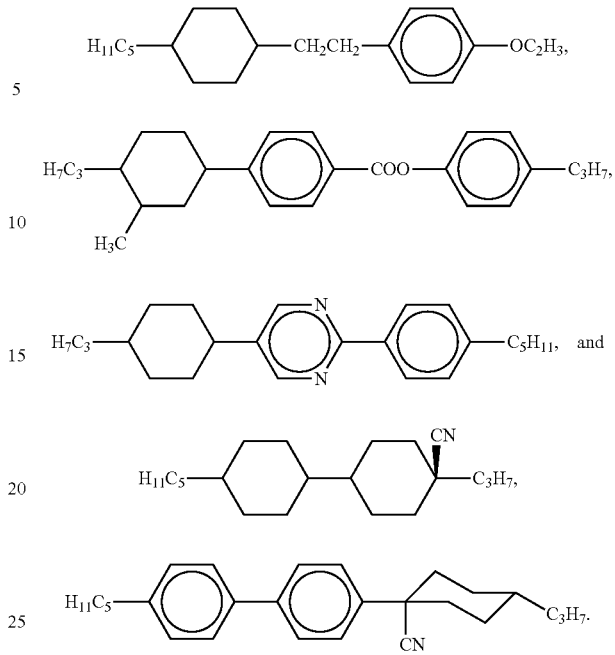

2. The liquid crystal material according to claim 1, wherein, in the liquid crystal material, a mass percentage of the liquid crystal molecules is 94.0%~98.6%, a mass percentage of the vertical alignment agent is 1.0%~5.0%, and a mass percentage of the polymerizable monomers is 0.3%~0.5%; and the polymerizable monomers comprise one or a combination of more than one of acrylates, acrylate derivatives, methacrylates, methacrylate derivatives, styrene, styrene derivatives, and epoxy resin.

3. The liquid crystal material according to claim 1, wherein the liquid crystal material further comprises a photo initiator, a mass percentage of the photo initiator is 0.1%~0.5%, the photo initiator comprises one or a combination of more than one of azobisisobutyronitrile, dialkyl peroxide base compounds, diacyl peroxide base compounds, and lipid peroxide base compounds.

4. A method of fabricating a liquid crystal display panel, comprising the following steps:

step 1, providing an upper substrate, a lower substrate, and a liquid crystal material;

the upper substrate comprising a first substrate, and a first electrode disposed on the first substrate; the lower substrate comprising a second substrate, and a second electrode disposed on the second substrate;

the liquid crystal material comprising liquid crystal molecules, a vertical alignment agent, and polymerizable monomers;

the vertical alignment agent comprising one or more than one of the following compounds:

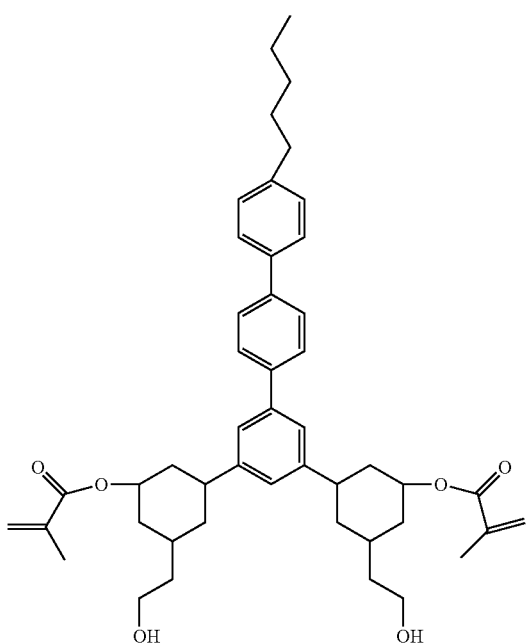

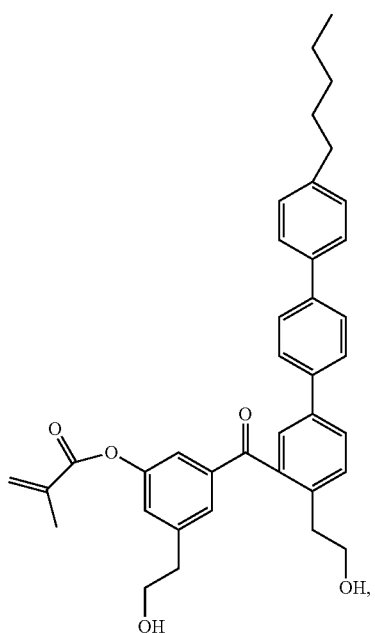

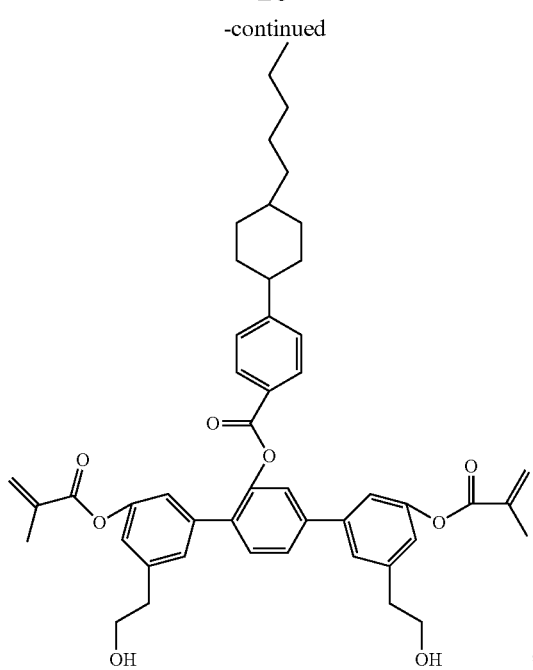

and
the liquid crystal molecules comprises one or more than one of the following negative dielectric anisotropic liquid crystal compounds:

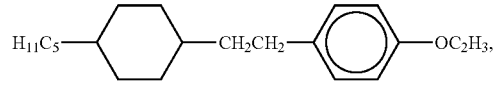
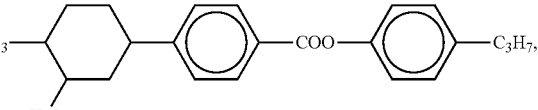
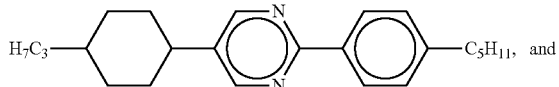
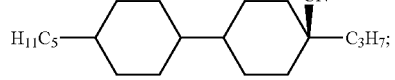

step 2, dripping the liquid crystal material on the upper substrate or the lower substrate, coating a sealant on a peripheral position of the upper substrate or the lower substrate, then assembling and laminating the upper substrate and the lower substrate, and curing the sealant;

wherein a part of the vertical alignment agent in the liquid crystal material is adsorbed in the upper substrate and the lower substrate reaching a saturation adsorption, and arranged perpendicular to the upper substrate and the lower substrate, so as to guide the liquid crystal molecules arranged perpendicular to the upper substrate and the lower substrate; and another part of the vertical alignment agent dissociates in the liquid crystal material;

step 3, applying a voltage to both sides of the liquid crystal material through the first electrode and the second electrode, wherein the liquid crystal molecules deflect and arrange at a certain inclination angle between the upper substrate and the lower substrate;

performing a first ultraviolet irradiation to the liquid crystal material from a side of the upper substrate or the lower substrate, wherein the vertical alignment agent in the liquid crystal material and the polymerizable monomers are polymerized to form a polymer, wherein the polymer deposits on the upper substrate toward a side of the liquid crystal material to form a first polymer film, and simultaneously deposits on the lower substrate toward a side of the liquid crystal material to form a second polymer film, both the first polymer film and the second polymer film have rough surfaces; and step 4, to stop applying the voltage to the both sides of the liquid crystal layer, due to both the first polymer film and the second polymer film having the rough surfaces, the liquid crystal molecules near the first polymer film and the second polymer film maintains their inclination angle in a steric hindrance manner, and the liquid crystal molecules away from the first polymer film and the second polymer film reinstates a vertical alignment;

performing a second ultraviolet irradiation to the liquid crystal material from a side of the upper substrate or the lower substrate, wherein the retained vertical alignment agent and the polymerizable monomers in the liquid crystal material are polymerized to form a polymer, wherein the polymer deposits on the first polymer film and the second polymer film;

constituting a liquid crystal layer by the liquid crystal material in which the vertical alignment agent and the polymerizable monomers are removed, to complete the fabrication of the liquid crystal display panel.

5. The method of fabricating the liquid crystal display panel according to claim 4, wherein, in the liquid crystal material, a mass percentage of the liquid crystal molecules is 94.0%~98.6%, a mass percentage of the vertical alignment agent is 1.0%~5.0%, and a mass percentage of the polymerizable monomers is 0.3%~0.5%; and the polymerizable monomers comprise one or a combination of more than one of acrylates, acrylate derivatives, methacrylates, methacrylate derivatives, styrene, styrene derivatives, and epoxy resin.

6. The method of fabricating the liquid crystal display panel according to claim 4, wherein the liquid crystal material further comprises a photo initiator, a mass percentage of the photo initiator is 0.1%~0.5%, the photo initiator comprises one or a combination of more than one of azobisisobutyronitrile, dialkyl peroxide base compounds, diacyl peroxide base compounds, and lipid peroxide base compounds.

7. The method of fabricating the liquid crystal display panel according to claim 4, wherein, in step 3, the voltage applied to the both sides of the liquid crystal material is 13~25V;

in the first ultraviolet irradiation of step 3, an illumination intensity of the ultraviolet is 85~100 mW/cm$^2$, an irradiation time is 20~30 min; and in the second ultraviolet irradiation of step 4, an illumination intensity of the ultraviolet is 85~100 mW/cm$^2$, an irradiation time is 90~120 min.

8. The method of fabricating the liquid crystal display panel according to claim 4, wherein, in step 1, the upper substrate and the lower substrate are a thin film transistor (TFT) substrate and a color filter (CF) substrate respectively; the first electrode and the second electrode are a pixel electrode and a common electrode respectively; and in step 3 and step 4, the first and the second ultraviolet irradiations are performed from the side of the upper substrate.

9. A liquid crystal display panel, comprising: oppositely disposed an upper substrate and a lower substrate, a liquid crystal layer disposed between the upper substrate and the lower substrate, a first polymer film disposed on the upper substrate toward a side surface of the liquid crystal layer, and a second polymer film disposed on the lower substrate toward a side surface of the liquid crystal layer; wherein the upper substrate comprises a first substrate and a first electrode disposed on the first substrate; the lower substrate comprises a second substrate and a second electrode disposed on the second substrate;

the liquid crystal layer comprises liquid crystal molecules; the liquid crystal molecules in the liquid crystal layer near the first polymer film and the second polymer film arrange at a certain inclination angle between the upper substrate and the lower substrate; the liquid crystal molecules in the liquid crystal layer away from the first polymer film and the second polymer film arrange perpendicular to the upper substrate and the lower substrate;

wherein both the first polymer film and the second polymer film have rough surfaces;

the vertical alignment agent comprises one or more than one of the following compounds:

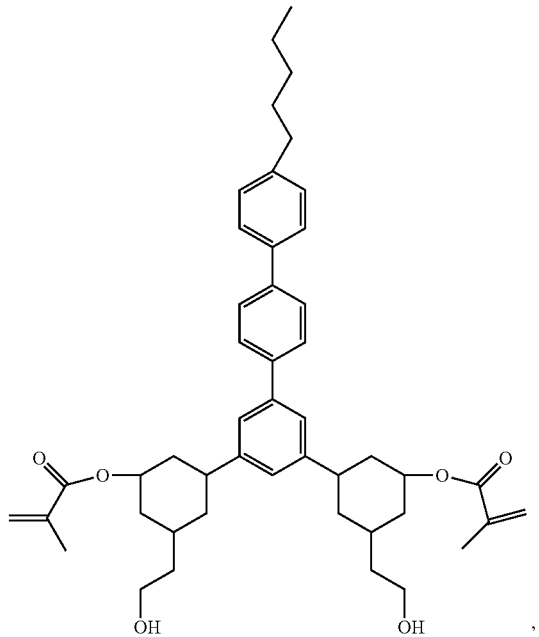

-continued

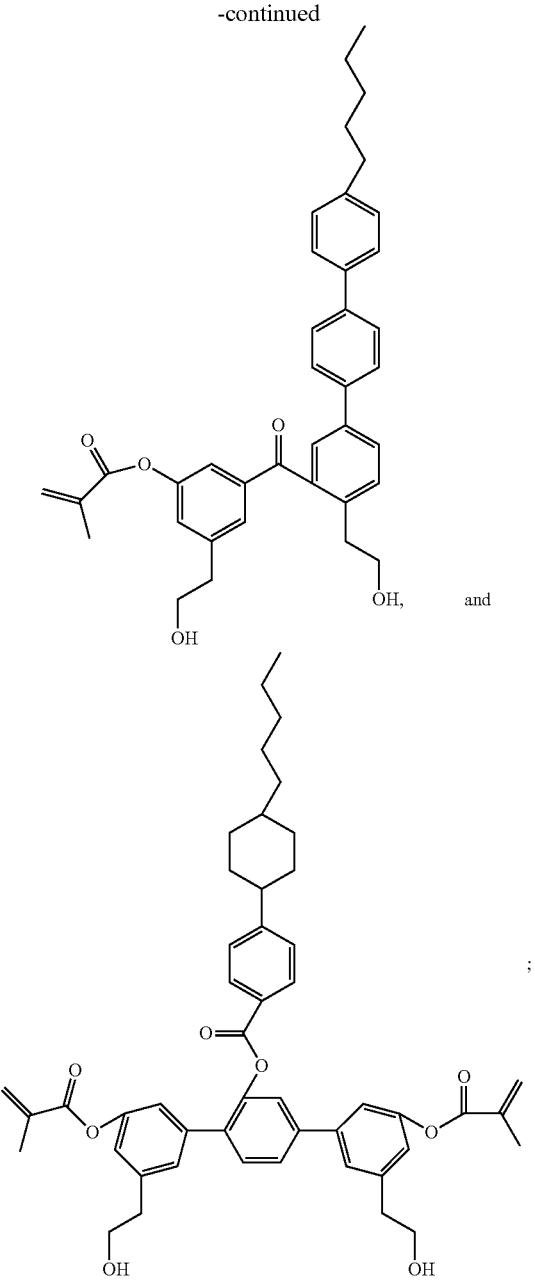

and the liquid crystal molecules comprises one or more than one of the following negative dielectric anisotropic liquid crystal compounds:

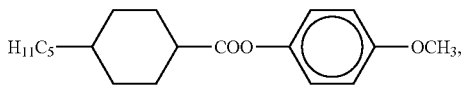

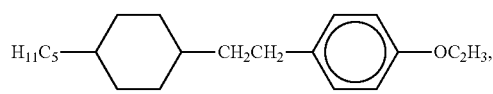

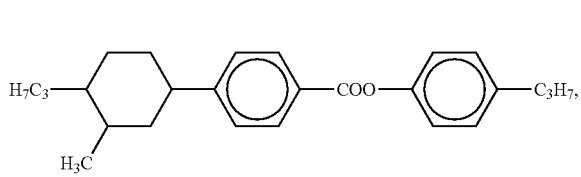

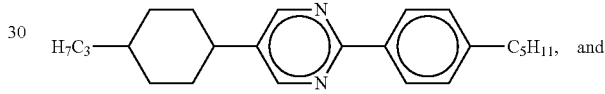

and

10. The liquid crystal display panel according to claim 9, wherein the polymerizable monomers comprise one or a combination of more than one of acrylates, acrylate derivatives, methacrylates, methacrylate derivatives, styrene, styrene derivatives, and epoxy resin; and thicknesses of the first polymer film and the second polymer film are 600~1200 Å.

* * * * *